United States Patent
Kim

(10) Patent No.: US 7,252,422 B2
(45) Date of Patent: Aug. 7, 2007

(54) FIXING STRUCTURE FOR A HEAD LAMP MODULE OF AN AUTOMOBILE

(75) Inventor: Myeong-Ki Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 151 days.

(21) Appl. No.: 11/149,537

(22) Filed: Jun. 10, 2005

(65) Prior Publication Data
US 2006/0007694 A1    Jan. 12, 2006

(30) Foreign Application Priority Data
Jul. 8, 2004 (KR) ............. 10-2004-0053202

(51) Int. Cl.
*F21V 19/00* (2006.01)
(52) U.S. Cl. ............. 362/549; 362/507; 362/370; 362/457; 362/368
(58) Field of Classification Search ........ 362/505–507, 362/502, 538, 549, 496, 476, 396, 546, 432, 362/457–458, 370, 368; 224/547, 567, 571; 248/27.3, 309.1, 300
See application file for complete search history.

(56) References Cited

U.S. PATENT DOCUMENTS

| | | | |
|---|---|---|---|
| 1,580,819 A * | 4/1926 | Garman et al. | 362/275 |
| 4,797,791 A * | 1/1989 | Burchick | 362/473 |
| 6,019,490 A | 2/2000 | Kibayashi | |
| 6,886,968 B1 * | 5/2005 | Hamelink et al. | 362/485 |
| 2004/0160784 A1 * | 8/2004 | Park | 362/507 |

FOREIGN PATENT DOCUMENTS

| | | |
|---|---|---|
| JP | 9-220970 | 8/1997 |
| KR | 10-2002-0017506 | 3/2002 |
| WO | 03/076229 | 9/2003 |

OTHER PUBLICATIONS

English Language Abstract of KR 10-2002-0017506.
English Language Abstract of JP 9-220970.

* cited by examiner

*Primary Examiner*—Renee Luebke
*Assistant Examiner*—Robert May
(74) *Attorney, Agent, or Firm*—Greenblum & Bernstein, P.L.C.

(57) ABSTRACT

A fixing structure for a head lamp module of an automobile comprises the head lamp module, a bracket, and a clip. The head lamp module, configured to be coupled to the font surface of a carrier of the automobile, has a fixing panel piece integrally formed at an upper position thereof to be fixed at the carrier, and a pair of rearward-protruding semi-circular loops defining fitting bores, respectively. The bracket has a pair of rectangular holes which allow the loops of the head lamp module to pass there through, so as to position the fitting bores in front of the bracket, and a pair of bolt holes, which allow the bracket to be bolted to the front surface of the carrier. The clip is configured to be inserted downward through the fitting bores of the loops passed though the holes of the bracket, so as to allow the head lamp module to be mounted to the front surface of the carrier via the bracket.

3 Claims, 8 Drawing Sheets

FIXING STRUCTURE FOR A HEAD LAMP MODULE OF AN AUTOMOBILE

RELATED APPLICATIONS

The present disclosure relates to subject matter contained in Korean Application No. 10-2004-53202, filed on Jul. 8, 2004, the subject matter of which is expressly incorporated by reference herein in its entirety.

BACKGROUND OF THE INVENTION

1. Field of the Invention

The present invention relates to a fixing structure for a head lamp module of an automobile, and more particularly to a fixing structure for a head lamp module of an automobile in which the head lamp module is coupled to a bracket of a carrier by means of a clip, thereby being capable of achieving simple attachment/detachment of the head lamp module relative to the carrier of the automobile without requiring disassembly of a bumper.

2. Description of the Related Art

In general, the body of an automobile, defining the a of the automobiles, is comprised of a passenger compartment, an engine room or trunk compartment, fender, and the like. Such an automobile body is divided into a front body, a center body, and a rear body, which are successively arranged in a longitudinal direction on an automobile.

The front body is mounted with a carrier for use in the assembling of head lamps, a radiator, a condenser, a bumper, etc. Integral assembly of the headlamps, radiator, condenser, bumper, etc. with the body panel has the effect of improving their assembling efficiency, and of ring the number of elements to be assembled, and their assembling time.

FIGS. 1 to 3 illustrate a structure for fixing a head lamp module to a carrier of an automobile according to the prior art. As can be seen from FIG. 1, the head lamp module generally comprises a lens 2, a bezel 3, a reflector 5, a bulb 7, a housing 9, and approximately three to four fixing elements. The fixing elements are mainly provided at the housing 9 to mount the head lamp module 1 to the automobile carrier. Here, the fixing elements to be coupled to the automobile carrier must have a strong enough strength capable of bearing the weight of the head lamp module 1 as well as any load caused when traveling. Further, the fixing elements must be easily coupled to or separated from the automobile carrier.

Such fixing elements, used to mount the head lamp module 1 to the carrier 10, includes: a fixing panel piece 13 formed at an upper portion of the housing 9 so as to be bolted to a predetermined location of a top surface portion 10a of the carrier 10; and a bracket 15 formed at a lateral portion of the housing 9 to be bolted to a predetermined location of a front surface portion 10b of the carrier 10.

When the head lamp module 1 is mounted to the carrier 10 by means of the fixing elements and in turn, a bumper 12 is mounted to the carrier 10, the bracket 15, serving to fix the head lamp module 1 to the carrier 10, is located behind the bumper 12 and concealed by the bumper 12 so as not to be exposed to the outside.

This means that, in order to exchange partial elements of the head lamp module 1 or the head lamp module 1 itself when the head lamp module 1 is damaged or broken down, the bumper 12 must be first separated from the carrier 10, and then bolts used to fix the fixing panel piece 13 and the bracket 15 must be released to separate the head lamp module 1 from the carrier 10.

In general, a head lamp selves as a light to illuminate a driver's visual field at night or when passing though a tunnel, and tends to be frequently damaged due to automobile crashes or other environmental factors. Therefore, in such a head lamp, it is important that the damaged head lamp be easily exchanged with a new one without requiring separation of any other associated elements. Separation of other associated elements, such as a bumper, causes an increase in repair costs and time.

In the conventional fixing slue of the head lamp module as mentioned above, however, the bumper must be first separated from the head lamp module in order to exchange the head lamp module, thus making it impossible to achieve rapid repair of the head lamp module.

SUMMARY OF THE INVENTION

Therefore, the present invention has been made in view of the above problems, and it is an object of the present invention to provide a fixing suture for a head lamp module of an automobile, which allows the head lamp module to be simply separated from an automobile carrier without requiring disassembly of a bumper mounted on the carrier, thereby enabling rapid and easy repair of a head lamp and facilitating initial assembly of the head lamp.

In accordance with the present invention, the above and other objects can be accomplished by the provision of a fixing sure for a head lamp module of an automobile comprising: a head lamp module configured to be coupled to the front surface of a carrier of the automobile, the head lamp module having a fixing panel piece integrally formed at an upper position thereof to be fixed at the carrier, and a pair of rearward protruding semi-circular loops defining the fitting bores, respectively; a bracket having a pair of rectangular holes to allow the loops of the head lamp module to pass there through so as to position the fitting bores in font of the bracket, and a pair of bolt holes to allow the bracket to be bolted to the font surface of the carrier; and a clip configured to be inserted downward though the fitting bores of the loops passed through the holes of the bracket, so as to allow the head lamp module to be mounted to the front surface of the carrier via the bracket.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be explained with reference to the accompanying drawings.

It is to be understood that the following detailed description related to the embodiments of the present invention are exemplary and explanatory only and not restrictive of the invention, and the present invention can be implemented in numerous ways.

Figure 1:
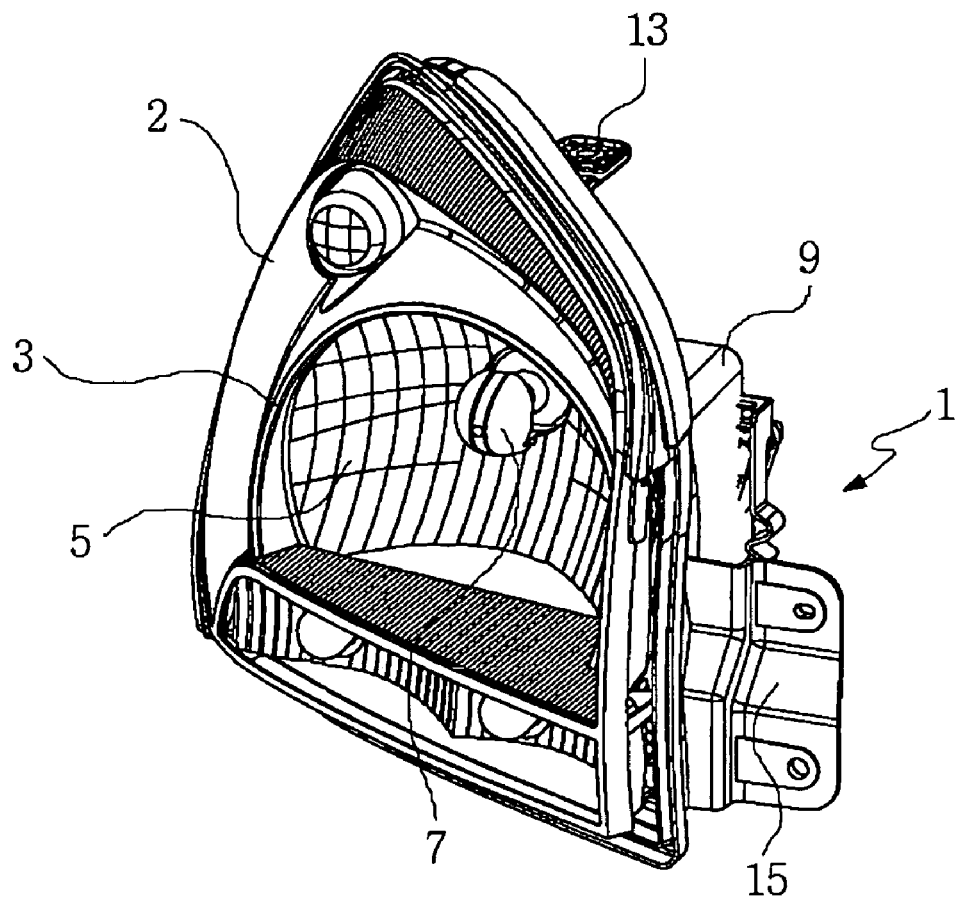
FIG. 1 is a perspective view illustrating a head lamp module of an automobile according to the prior art.
Figure 2:
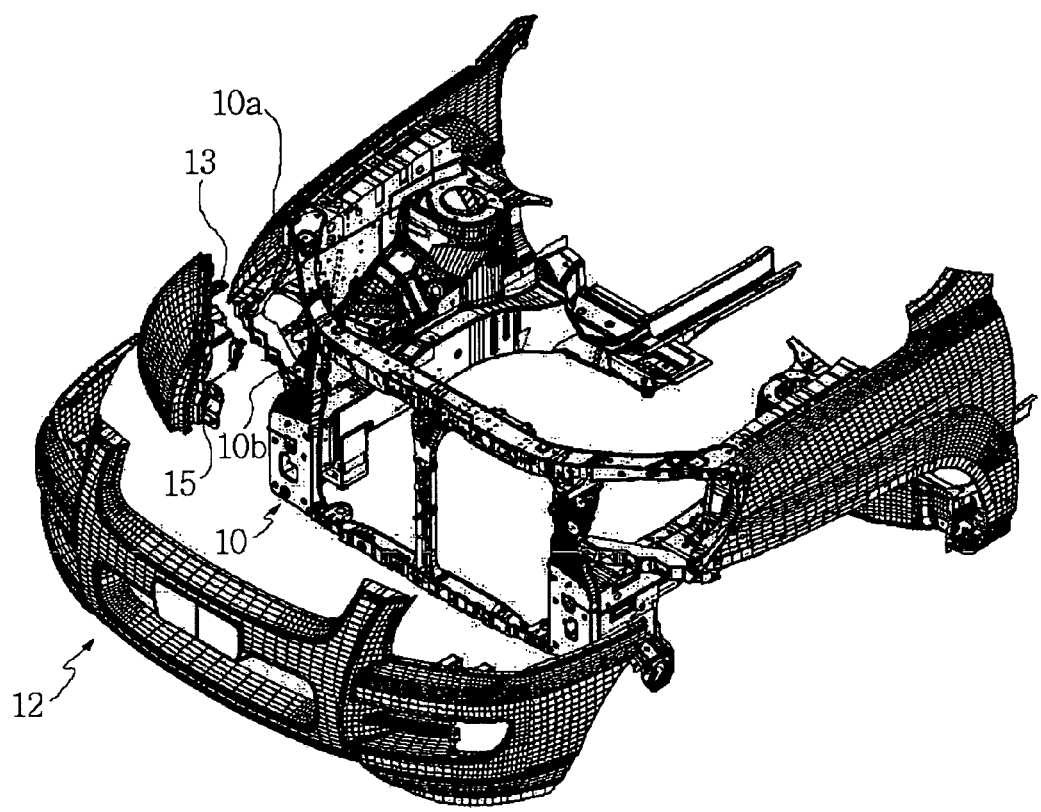
FIG. 2 is an exploded perspective view illustrating a fixture structure for the head lamp module according to the prior art.
Figure 3:
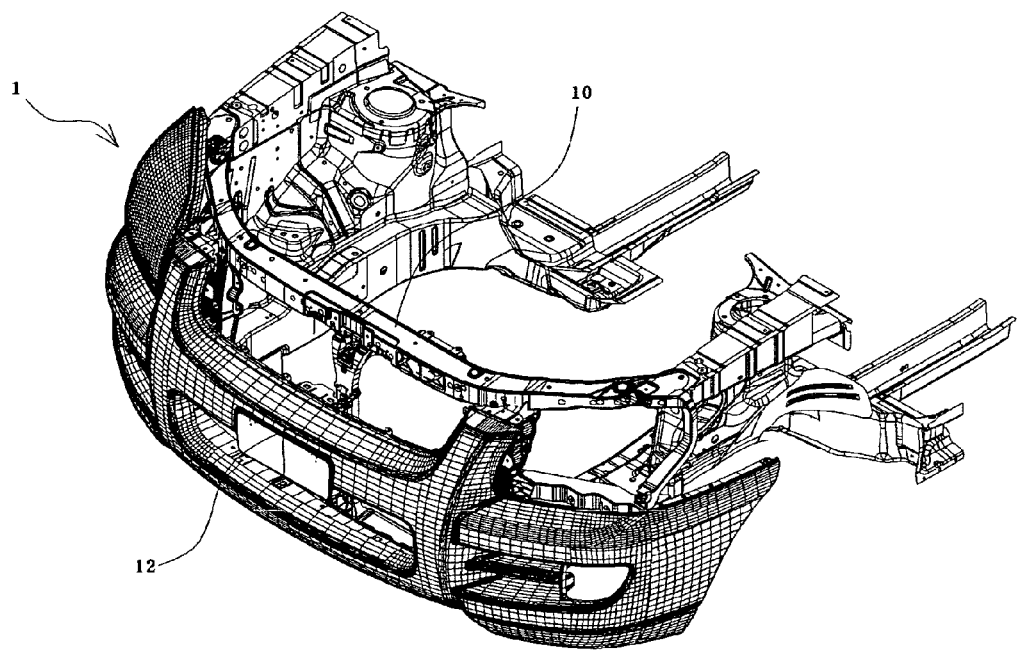
FIG. 3 is a perspective view illustrating a state wherein the head lamp module is mounted to a carrier of the automobile by means of the fixing structure according to the prior art.
Figure 4:
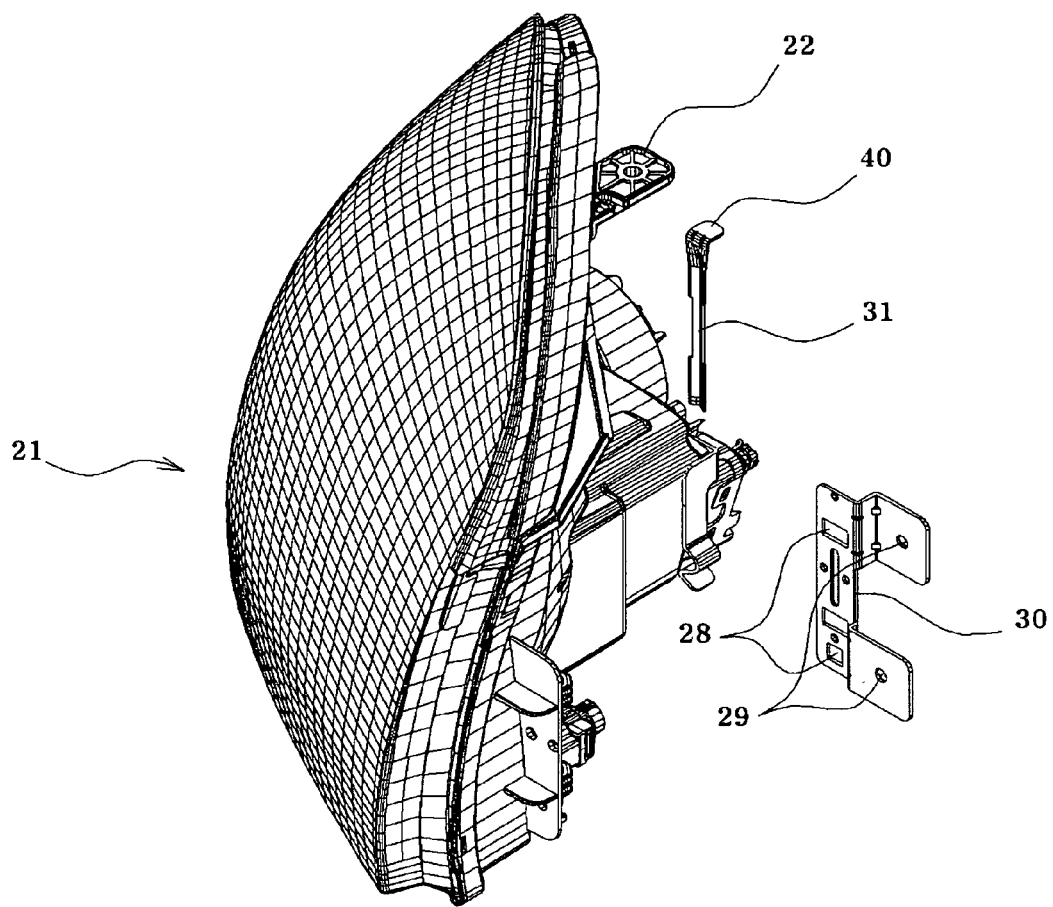
FIG. 4 is an exploded perspective view illustrating a fixture for a head lamp module of an automobile according to an embodiment of the present invention.
Figure 5:
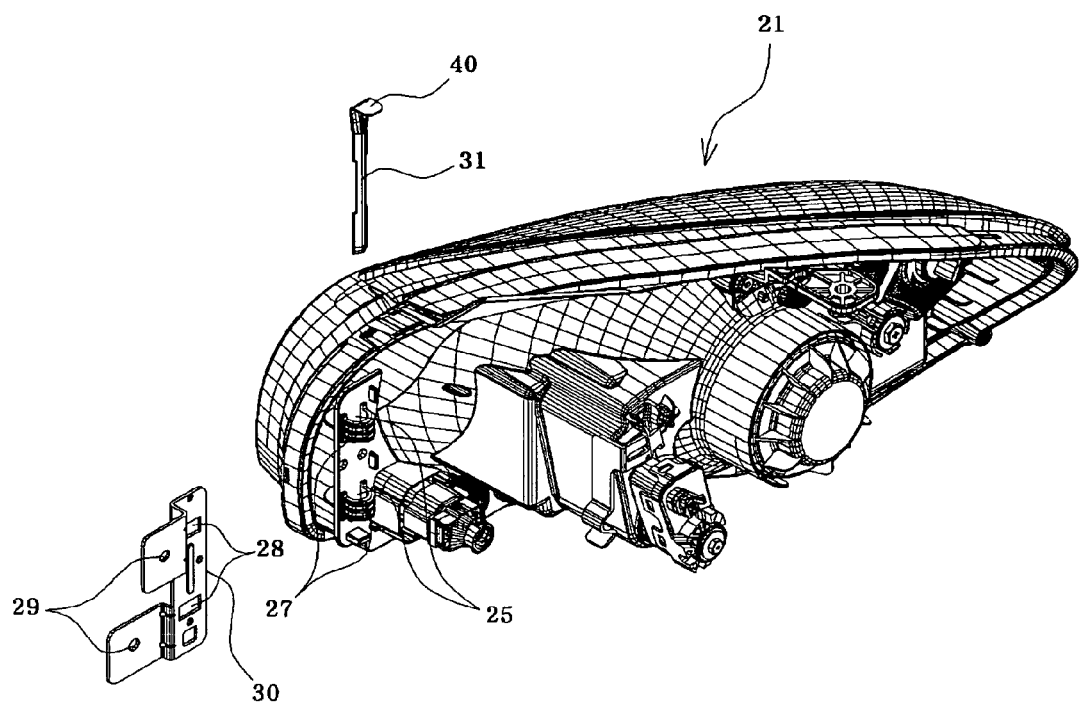
FIG. 5 is an exploded perspective view of the fixing structure for the head lamp module according to the embodiment of the present invention, as seen from the opposite direction of FIG. 4.
Figure 6:
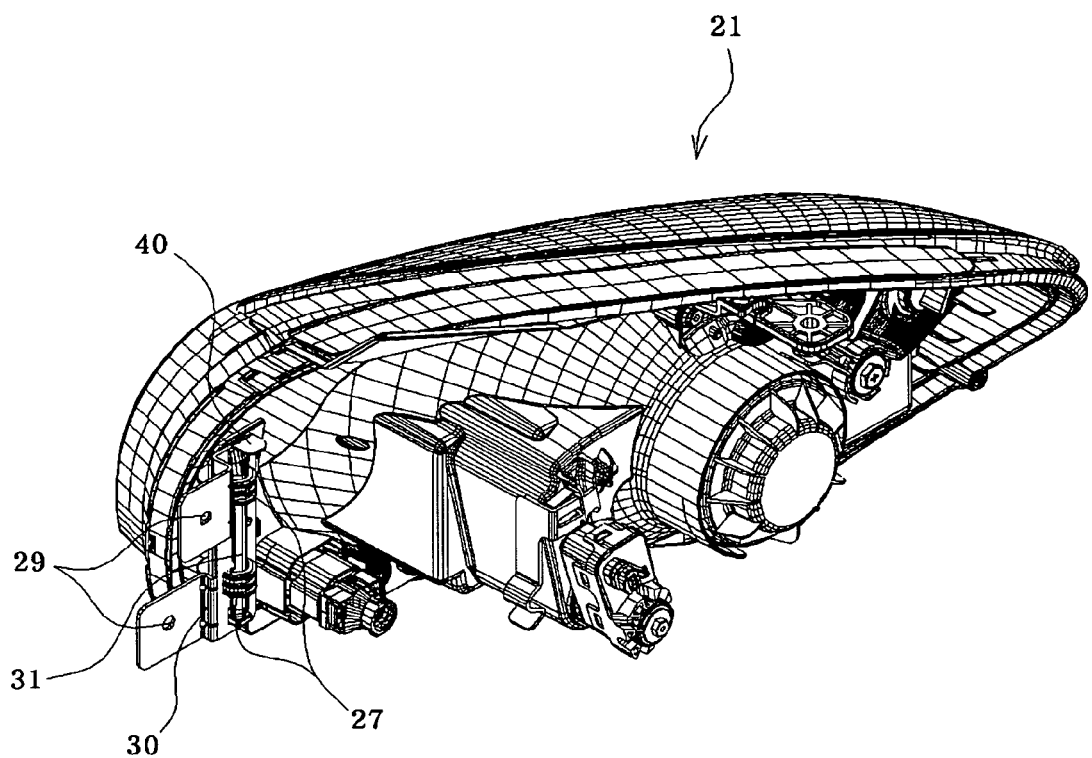
FIG. 6 is a perspective view illustrating an assembled state of the fixing structure for the head lamp module according to the embodiment of the present invention.
Figure 7:
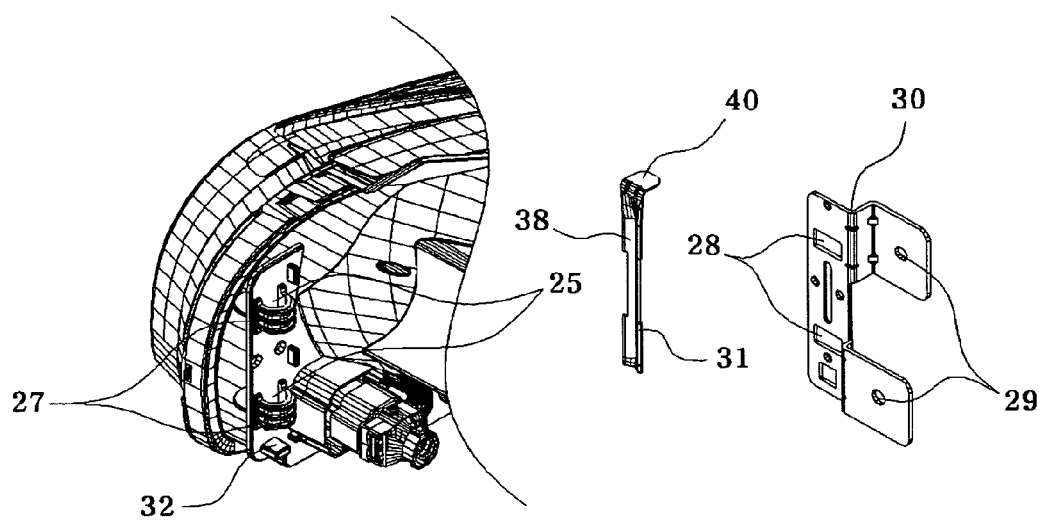
FIG. 7 is a perspective view illustrating loops, a bracket, and a clip constituting the fixing structure for the head lamp module according to the embodiment of the present invention.
Figure 8:
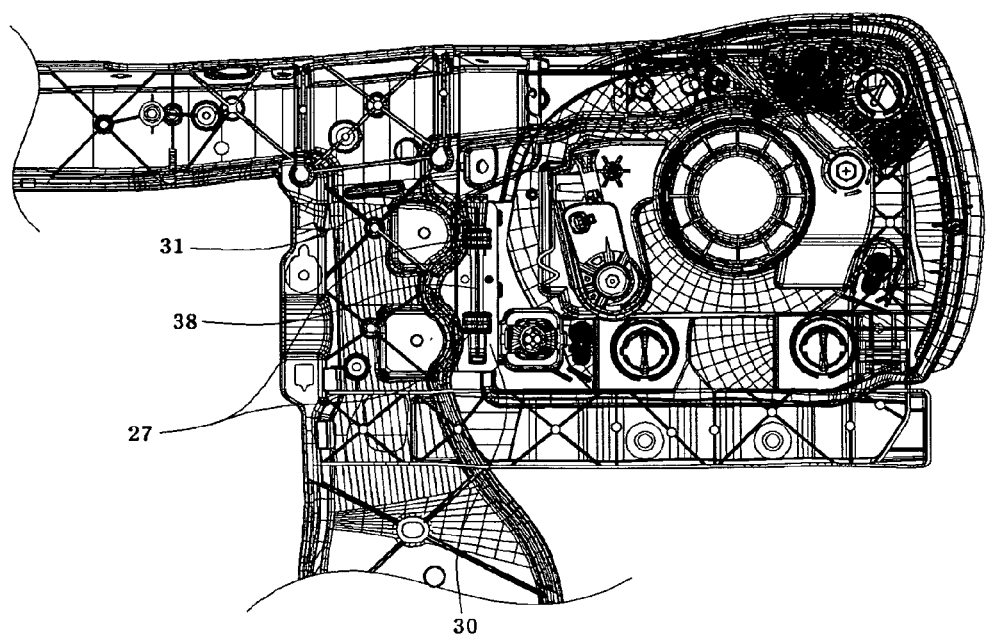
FIG. 8 is a rear sectional view of the fixing store for the head lamp module according to the embodiment of the present invention.

FIG. 4 is an exploded perspective view illustrating a fixing structure for a head lamp module of an automobile according to an embodiment of the present invention. FIG. 5 is an exploded perspective view of the fixing structure for the head lamp module, as seen from the opposite direction of FIG. 4. FIG. 6 is a perspective view illustrating an assembled state of the fixing structure for the head lamp module. FIG. 7 is a perspective view illustrating loops, a bracket, and a clip constituting the fixing structure for the head lamp module. FIG. 8 is a rear sectional view of the fixing structure for the head lamp module.

As shown in FIGS. 4 to 8, the fixing structure of the present invention comprises a head lamp module 21, a bracket 30, and a clip 31. The head lamp module 21, configured to be coupled to the front surface of a carrier of an automobile, has a fixing panel piece 22 integrally formed at an upper position thereof to allow penetration of a bolt used to fix the head lamp module 21 to the automobile carrier, and a pair of rearward-protruding semi-circular loops 27 defining fitting bores 25, respectively. The bracket 30 has a pair of holes 28 to allow the loops 27 of the head lamp module 21 to pass there through so as to position the fitting bores 25 in front of the bracket 30, and a pair of bolt holes 29 to allow the bracket 30 to be mounted to the front surface of the carrier by means of bolts. The clip 31 is configured to be inserted downward though the fitting bores 25 positioned in front of the bracket 30 as the loops 27, defining the fitting bores 25, pass through the holes 28 of the bracket 30. Thereby, the head lamp module 21 is mounted to the front surface of the carrier by means of the bracket 30 and the clip 31.

Preferably, the head lamp module 21 is formed with a protrusion 32 below the loops 27 defining the fitting bores 25 in order to impede the downward insertion of the clip 31 through the fitting bores 25.

In order to allow the clip 31 to come into elastic contact with the inner circumference of the respective loops 27 defining the fitting bores 25 as it inserted into the fitting bores 25, preferably, the clip 31 has a convex front surface and at a rear surface of the clip 31 is formed a linear longitudinal groove 38. Further, an upper end of the clip 31 forms an L-shaped bent portion 40 to ensure easy manual insertion or pulling operation of the clip 31 into or from the fling bores 25.

Now, the operation and effects of the fixing structure for the lamp module 21 according to the present invention will be explained.

With the configuration of the present invention as mentioned above, in order to mount the head lamp module 21 to the carrier, the head lamp module 21 is first located in a space defined lateral to the carrier, and then is fixed to a top surface portion of the carrier by fastening a bolt through the fixing panel piece 22 of the head lamp module 21.

After the head lamp module 21 is fixed in place, the bracket 30, which was previously bolted to the carrier, is coupled to the head lamp module 21 as the loops 27 formed at the head lamp module 21 pass through the holes 28 of the bracket 30. In such a coupled state, the fitting bores 25 defined by the loops 27 are positioned in front of the bracket 30.

Then, the clip 31 is inserted through the fling bores 25 from a lower end thereof opposite to the L-shaped bent portion 40 as an operator grips and pushes the bent portion 40 downward until the lower end of the clip 31 reaches the protrusion 32 located below the fitting bores 25.

While passing though the fitting bores 25, the linear longitudinal groove 38, formed along a center axis of the clip 31, experiences elastic deformation, allowing the clip 31 to come into elastic contact with the inner circumference of the respective loops 27 defining the fitting bores 25 at predetermined positions of the clip 31.

In this way, the clip 31, inserted through the fitting bores 25 while in contact with the loops 27, is fixed in the fitting bores 25 by virtue of its elasticity.

In such a completely inserted state, the clip 31 is located behind the bumper of the automobile, but the bent portion 40 of the clip 31 is revealed to the outside.

Thereby, when it is desired to separate the head lamp module 21, which is integrated with the bracket 30 by means of the clip 31, from the carrier without assembly of the bumper, the fixing panel piece 22 of the head lamp module 21 is unbolted, and the bent portion 40 of the clip 31, revealed behind the bumper, is pulled upward, so as to pull out the clip 31 from the fitting bores 25.

At the same time as the clip 31 is pulled out, the bracket 30 is separated from the head lamp module 21 as the loops 27 of the head lamp module 21 are released from the holes 28 of the bracket 30. In this way, the head lamp module 21 is completely separated from the carrier.

That is, as a result of coupling the head lamp module 21 to the bracket 30 of the carrier by means of the clip 31, even if the fixing portion of the head lamp module 21 is concealed by the be so as not to allow separation of the head lamp module 21 from the carrier, the head lamp module 21 can be simply separated from the carrier though removal of the clip 31 from the loops 27.

As apparent from the above description, the present invention provides a fixing structure for a head lamp module of an automobile, which allows the head lamp module to be simply separated from an automobile carrier without requiring disassembly of a bumper mounted on the carrier, thereby enabling rapid and easy repair of a head lamp and facilitating initial assembly of the head lamp performed by a manufacturer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fixing structure for a head lamp module of an automobile comprising:

a head lamp module configured to be coupled to a front surface of a carrier of the automobile, the head lamp module having a fixing panel piece integrally formed adjacent an upper portion thereof to be fixed at the carrier, and a pair of rearward-protruding semi-circular loops defining fitting bores, respectively;

a bracket having a pair of rectangular holes to allow the loops of the head lamp module to pass there through so as to position the fitting bores on a rearward side of the bracket, and a pair of bolt holes to allow the bracket to be bolted to the front surface of the carrier; and a clip configured to be inserted downward through the fitting bores of the loops passed through the holes of the bracket, so as to allow the head lamp module to be mounted to the front surface of the carrier via the bracket.

2. The structure as set forth in claim 1, wherein the head lamp module is formed with a protrusion below the loops defining the fitting bores in order to impede the downward insertion of the clip through the fitting bores.

3. The structure as set forth in claim 1, wherein the clip has a convex front surface and a rear surface formed with a linear longitudinal groove in order to allow the clip to come into elastic contact with the inner circumference of the respective loops defining the fining bores as it is inserted into the fitting bores, and an upper end of the clip forms an L-shaped bent portion to ensure easy manual insertion or pulling operation of the clip into or from the fitting bores.

* * * * *

UNITED STATES PATENT AND TRADEMARK OFFICE
CERTIFICATE OF CORRECTION

| | |
|---|---|
| PATENT NO. | : 7,252,422 B2 |
| APPLICATION NO. | : 11/149537 |
| DATED | : August 7, 2007 |
| INVENTOR(S) | : Myeong-Ki Kim |

It is certified that error appears in the above-identified patent and that said Letters Patent is hereby corrected as shown below:

On the Cover Sheet, in the Abstract (57), of the printed patent at line 3 "font" should read --front--.

On the Cover Sheet, in the Abstract (57), of the printed patent at line 14 "though" should read --through--.

At column 6, line 12 (claim 3, line 5), of the printed patent "fining" should read --fitting--.

Signed and Sealed this

Eighth Day of July, 2008

JON W. DUDAS
*Director of the United States Patent and Trademark Office*